US009591265B2

(12) United States Patent
Grubb et al.

(10) Patent No.: US 9,591,265 B2
(45) Date of Patent: Mar. 7, 2017

(54) SYSTEM AND METHOD FOR INTERACTIVE ADVERTISING VIA NETWORK GENERATED OVERLAYS

(75) Inventors: David Grubb, Doylestown, PA (US); Raymond C. Bontempi, Jamison, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 1156 days.

(21) Appl. No.: 12/344,986

(22) Filed: Dec. 29, 2008

(65) Prior Publication Data

US 2010/0169932 A1   Jul. 1, 2010

(51) Int. Cl.
*G06F 3/00* (2006.01)
*G06F 13/00* (2006.01)
*H04N 5/445* (2011.01)
*H04N 7/173* (2011.01)
*H04N 7/16* (2011.01)
*H04N 21/472* (2011.01)
*H04N 21/482* (2011.01)
*H04N 21/4722* (2011.01)
*H04N 21/6587* (2011.01)
*H04N 21/433* (2011.01)
*H04N 21/234* (2011.01)
*H04N 21/81* (2011.01)

(52) U.S. Cl.
CPC ......... *H04N 7/165* (2013.01); *H04N 5/44504* (2013.01); *H04N 5/44543* (2013.01); *H04N 7/17318* (2013.01); *H04N 7/17336* (2013.01); *H04N 21/23424* (2013.01); *H04N 21/4331* (2013.01); *H04N 21/4722* (2013.01); *H04N 21/47202* (2013.01); *H04N 21/47214* (2013.01); *H04N 21/482* (2013.01); *H04N 21/6587* (2013.01); *H04N 21/812* (2013.01)

(58) Field of Classification Search
None
See application file for complete search history.

(56) References Cited

U.S. PATENT DOCUMENTS

| 5,191,410 | A | * | 3/1993 | McCalley | H04M 11/085 348/E5.008 |
| 5,583,560 | A | * | 12/1996 | Florin et al. | 725/40 |
| 6,006,257 | A | * | 12/1999 | Slezak | 725/110 |
| 6,539,548 | B1 | * | 3/2003 | Hendricks | H04H 20/42 348/E5.002 |
| 7,302,696 | B1 | * | 11/2007 | Yamamoto | 725/23 |
| 7,360,230 | B1 | * | 4/2008 | Paz et al. | 725/47 |
| 7,945,926 | B2 | * | 5/2011 | Dempski | H04N 5/4401 725/32 |
| 2001/0042246 | A1 | * | 11/2001 | Yuen et al. | 725/1 |

(Continued)

OTHER PUBLICATIONS

Office Action dated Jul. 7, 2016 in Canadian Patent Application No. 2688701.

(Continued)

*Primary Examiner* — Jonathan V Lewis
(74) *Attorney, Agent, or Firm* — Byrne Poh LLP

(57) ABSTRACT

In accordance with an aspect of the present invention, a mechanism is used to enable interactive functions via network generated overlays. This invention enables network operators to launch interactive functionality without requiring changes to existing equipment that exists in the field on the client end.

16 Claims, 3 Drawing Sheets

(56) References Cited

U.S. PATENT DOCUMENTS

| | | |
|---|---|---|
| 2003/0046690 A1* | 3/2003 | Miller .............................. 725/36 |
| 2003/0110511 A1* | 6/2003 | Schutte et al. ................ 725/131 |
| 2003/0149988 A1* | 8/2003 | Ellis .................. H04N 5/44543 725/87 |
| 2004/0034874 A1* | 2/2004 | Hord et al. ................... 725/136 |
| 2004/0194137 A1* | 9/2004 | Shreesha ............ H04N 5/44543 725/41 |
| 2006/0161959 A1* | 7/2006 | Ryman ................. G11B 27/105 725/88 |
| 2006/0248568 A1* | 11/2006 | Hamuz-Cohen et al. .... 725/132 |
| 2008/0178211 A1* | 7/2008 | Lillo et al. ...................... 725/32 |
| 2008/0281689 A1* | 11/2008 | Blinnikka .............. G06Q 30/02 705/14.61 |
| 2010/0023966 A1* | 1/2010 | Shahraray .......... H04N 5/44543 725/34 |
| 2010/0086277 A1* | 4/2010 | Craner .................... H04N 5/76 386/278 |
| 2010/0131975 A1* | 5/2010 | Landow et al. ................ 725/34 |

OTHER PUBLICATIONS

Office Action dated Jul. 31, 2015 in Canadian Patent Application No. 2688701.
Office Action dated Oct. 31, 2014 in Canadian Patent Application No. 2688701.

* cited by examiner

SYSTEM AND METHOD FOR INTERACTIVE ADVERTISING VIA NETWORK GENERATED OVERLAYS

BACKGROUND

Conventional broadcast television relies on a receiving television set being tuned to a desired channel. Content is broadcast on many channels, and a given television may simply tune to a selected channel. Currently, many television providers are offering streaming television. Streaming television is programming that is sent to a receiver set when requested, or on-demand. This is also known as video on demand or, VOD. One of the more well known forms of VOD is pay-per-view, where a user selects content from a list, and purchases this content to be viewed at that particular moment. Thus, only one channel of content is provided to that user, which considerably reduces bandwidth usage over conventional broadcast television. With VOD there is two-way communication between a receiver and content provider. Typically this capability is provided by a set-top device connected to a television.

FIG. 1 illustrates a conventional VOD system 100. VOD system 100 includes a server system 101 and a client system 111, the two of which are connected by an access network 110. Server system 101 provides VOD content through access network 110 to be consumed by client system 111.

Server system 101 includes a stream controller 102, a VOD server 104, a video processor 108 and a database 106. Stream controller 102 coordinates the timing of a content package provided by server 101. VOD server 104 receives requests for content and provides a content package, corresponding to the requested content, via video processor 108. Video processor 108 receives data from VOD server 104 and prepares and sends the data through access network 110 following the proper protocols. Video processor 108 also receives requests through access network 110 and forwards these requests to VOD server 108. Database 106 stores content and advertisements.

Client system 111 includes a set-top unit 114, an input device 112 and a television 116. Set-top unit 114 receives input commands from input device 112 and sends the requests through access network 110 to server system 101. Set-top unit 114 additionally converts data signals to audio/video content and outputs the data to television 116.

Upon receipt of instructions, such as changing to a new channel, set-top unit 114 sends them upstream through access network 110 to video processor 108. Video processor 108 converts the instruction stream to a form VOD server 104 can interpret and sends the instructions to VOD server 104. VOD server 104 interprets the request and pulls the requested content from database 106.

The content may be any video or audio, non-limiting examples of which include, movies, music, games, etc. Further, the content may be pre-assembled with advertisements disposed therein, or stream controller 102 might insert advertisements into requested content. The combination of content and advertisements, if included, is the content package. An advertisement may be any video or audio that is not the content, non-limiting examples of which include commercials. By whichever conventional method a content package is assembled, stream controller 102 maintains pointers to where advertisements are placed throughout a content package, as described in more detail below with reference to FIG. 2.

FIG. 2 illustrates an example content package 200, which corresponds to a requested program that VOD server 104 might send through video processor 108. Content package 200 includes program portions 202, 204, 206 and 208 and advertisement portions 210, 212, 214 and 216. The program would start at time 218 and would end at time 220. The program is interrupted: at time 222 to play an advertisement corresponding to advertisement portion 210; at time 224 to play two advertisements corresponding to advertisement portions 212 and 214; and at time 226 to play an advertisement corresponding to advertisement portion 216. Content package 200 may include pointers, not shown, that direct set-top unit 114 to times 204, 208, 210 and so forth. Stream controller 102 arranges content package 200 with timing information, such as pointers, for real time operations.

Once a content package is properly assembled by stream controller 102, VOD server 104 sends the content package to video processor 108. Video processor 108 converts the content package to data packets that can be sent to client 111 through access network 110. Set-top unit 114 receives the data packets and converts the same to audio and video signals for playback on television 116.

Set-top unit 114 may perform many functions on the audio and video signals including pausing, playing, rewinding and fast-forwarding.

Conventionally, most advertising is accomplished by linearly inserting an advertisement within a program, i.e., a linear insertion. VOD and streaming broadcast content may incorporate different forms of overlays in addition to linearly inserted advertising. A graphically overlayed advertisement, or graphic overlay, is an advertisement that is disposed so as to cover at least a portion of the current program.

FIG. 3 illustrates display 116 having a current program 300 displayed thereon. The current program has an overlay 302 of other content. The overlay 302 "overlays" at least a portion of current program 300. Some non-limiting examples of overlays include a poster advertisement, a document, or a video advertisement being played on top of the program.

Another example of an overlay might include a squeezeback, wherein the advertisement would compress to a certain section of the screen, such as a corner or along the bottom. FIG. 4 illustrates an example squeezeback. In the figure, an advertisement 404 and a program 402 are each "squeezed back" to separate portions of display 116 to enable a user to view each in its entirety.

A problem with conventional advertisement methods is that a viewer may not want to waste time watching all of every advertisement. Some conventional technologies enable a view to skip advertisements in their entirety. However, with such technologies, a user may unknowingly skip an advertisement that the user would have otherwise wanted to view.

What is needed is a system and method that may enable the user to enjoy content provided by a provider, wherein the content includes advertisements therein, and wherein the user is able to control the advertisements to which the user may otherwise be exposed.

BRIEF SUMMARY

The present invention is operable to provide a system and method that may enable a user to enjoy content provided by a provider, wherein the content includes advertisements therein, and wherein the user is able to control the amount of some of the advertisements. One aspect of the present invention includes a system and method that enable a user to interact with content without requiring changes to existing set-top receivers and without requiring a specific application to be loaded to the set-top.

The user would be enabled to respond to prompts in some or all advertisements to trigger the playout of a longer, more in depth ad, and/or to request more information.

In accordance with an aspect of the present invention, a system is provided for use with a providing system including a stream controller, a source, a processor, a database, an access network and a unit. The providing system is operable to provide content to a user. The unit is operable to receive a content demand for requested content from the user and to provide a signal, based on the content demand, to the processor via the access network. The database has content data stored therein. The source is operable to retrieve a portion of the content data corresponding to the content demand. The stream controller is operable to arrange the portion of the content data. The source is further operable to provide the arranged portion of the content data to the processor. The processor is further operable to provide the arranged portion of the content data to the unit via the access network. The system comprises a playout controller operable to instruct the processor to add a request portion of data into the content data. Further, the request portion of data corresponds to a graphic overlay having instructions to prompt the user for action.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
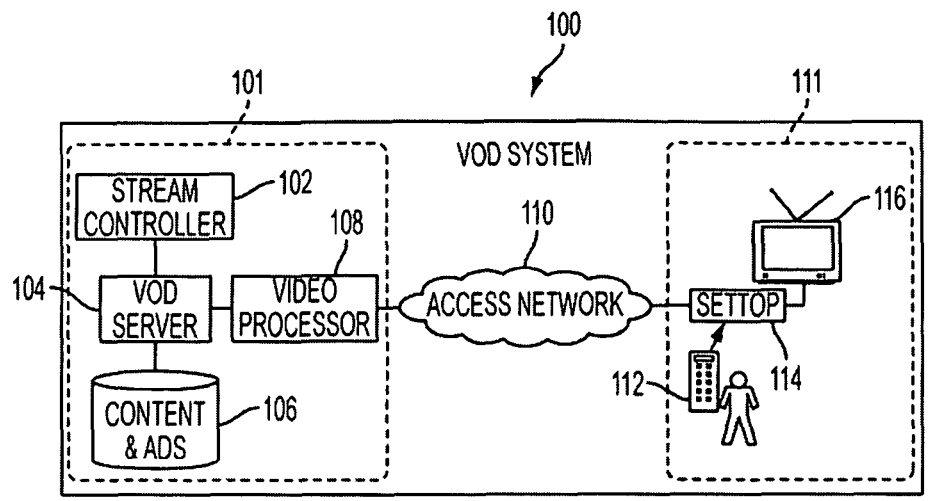
FIG. 1 illustrates a conventional VOD system.

In accordance with an example aspect of the present invention, a network operator is capable of providing interactive functionality, a non-limiting example of which includes telescoping advertising, without requiring changes to existing set-top units in the field, and without requiring a specific application in a set-top unit.

In an example embodiment of a system in accordance with an aspect of the present invention, advertising for VOD and broadcast content may include a mix of linear insertions of conventional advertisements in addition to linear insertions, overlays or squeezebacks that offer user interaction to enable further linear insertions, overlays or squeezebacks. A user is enabled to respond to prompts in some or all of the advertisements to trigger the playout of a longer form of the advertisements and/or to request more information without the need for a specific application in the set-top.

As will be described in greater detail below, in an example embodiment, when a user selects a VOD program, or broadcast content, a playout controller may establish a playout schedule for the content and advertising elements based on content rules, which may come from the network operator, the programmer or from programmer affiliates. The choice of advertising content may be dictated by the content rules or may come from an advertisement engine. The playout controller may then establish a playlist of the desired content including the sequencing of program content and advertisement content.

As the content is played, the playout controller may trigger a video processor to create overlays or squeezebacks at appropriate times. The timing may be coordinated with data from a stream controller to properly account for user actions like pausing, rewinding or fast forwarding of the program.

At any point, the playout controller can instruct the video processor to add a graphic overlay message with instructions to the user such as, "To learn more, press X", where X is a defined sequence of keystrokes on the set-top controller, e.g., remote control, like pressing the pause button twice. The playout controller may also provide a timing message to the stream controller indicating the duration of the response time. The graphic overlay may be presented to the user as part of the video. If the user decides to act upon the contents of the overlay, and the appropriate keys are pressed, these keypresses may be sent back up (with the set-top address) to the stream controller. The stream controller may intercept the key sequence, if pressed within the specified response time. The stream controller may then pass a message to the playout controller while also pausing the content. Alternatively, for broadcast content, if the client set-top is a recording device, it may cause the recording device to pause the broadcast content. The playout controller may then identify the proper additional advertising content based on information from the advertisement engine and the content rules and instruct the stream controller to play that specific advertisement content.

Alternatively, the same interaction mechanism may be used to trigger other actions including registering a vote, requesting information via email or mail and creating a bookmark for either VOD or online systems that the user may access later.

In another example embodiment of a system in accordance with an aspect of the present invention, a Switched Digital Video (SDV) system is operable to capture interactive responses related to broadcast content. A video processor, via an overlay or squeezeback, may instruct a user to enter a specified channel number into a remote control. For example, "To vote for Jeff, enter 987 on your remote control now." A SDV manager may then receive the channel change request and identify it as an interactive response based on the unique channel number. The reception of the unique channel number can be correlated with timing instructions from a playout controller. The response can be used to capture voting, request information, create a bookmark or other interactive functions.

An example embodiment of a system in accordance with a VOD aspect of the present invention will now be described with reference to FIGS. 5-7C.

Figure 5:
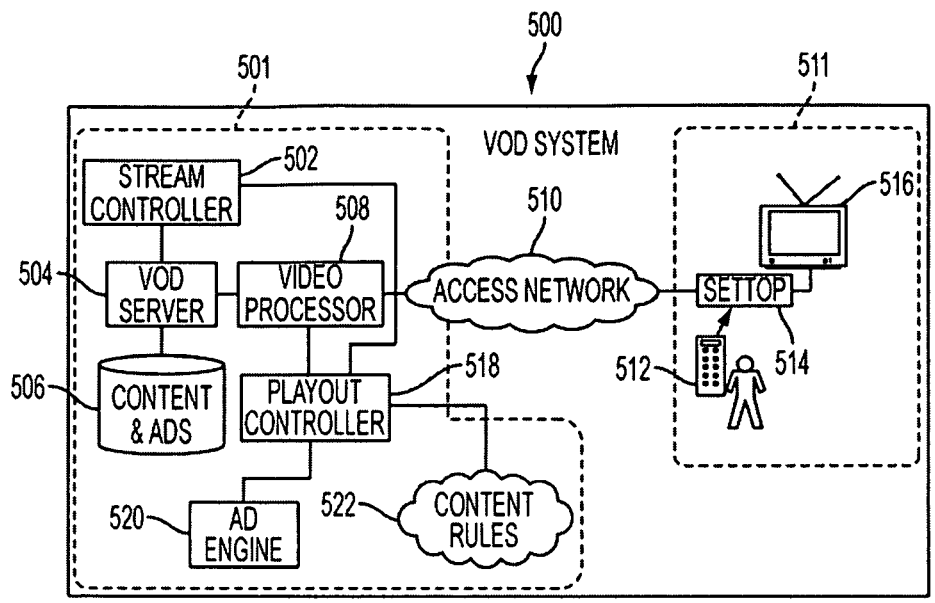
FIG. 5 illustrates an example system in accordance with an aspect of the present invention.

FIG. 5 illustrates an example system 500 in accordance with an aspect of the present invention. System 500 includes a server system 501, and a client system 511, the two of which are connected by an access network 510. Client system 511 requests content from server system 501. Server system 501 provides content packages, which correspond to requested content, respectively, through access network 510 to client system 511.

Server system 501 includes a stream controller 502, a VOD server 504, a database 506, a video processor 508, a playout controller 518, an advertisement engine 520 and a content rules portion 522. Stream controller 502 coordinates the timing of content packages provided by server 501. Video processor 508 receives requests through access network 510 and forwards these requests to VOD server 504. VOD server 504 receives requests for content and provides corresponding content packages. Video processor 508 receives data from VOD server 504 and prepares and sends the data through access network 510 following the proper protocols. Database 506 stores content and advertisements.

Playout controller 518 establishes a playlist of desired content by inserting additional advertisement content into an original content program compiled by VOD server 504. Additional advertisement content might include linear insertions, overlays, squeeze backs, etc., as previously described. Insertion of the additional advertisement content is governed by content rules within content rules portion 522. Content rules may be provided by a network operator, a programmer or from programmer affiliates. Advertisement engine 520 dictates, along with content rules, which advertising content is to be additionally inserted.

Client system 511 includes a set-top unit 514, an input device 512 and a television 516. Set-top unit 514 receives input commands from input device 512 and sends the requests upstream through access network 510 to server system 501. Set-top unit 514 additionally converts data signals to audio/video content and outputs the data on television 516. Upon receipt of the instructions, such as changing to a new channel, set-top unit 514 sends them upstream through access network 510 to video processor 508. Video processor 508 would convert the instruction stream to a form VOD server 504 can interpret and send the instruction to VOD server 504. VOD server 504 interprets the request and pulls the requested content from database 506.

Figure 6:
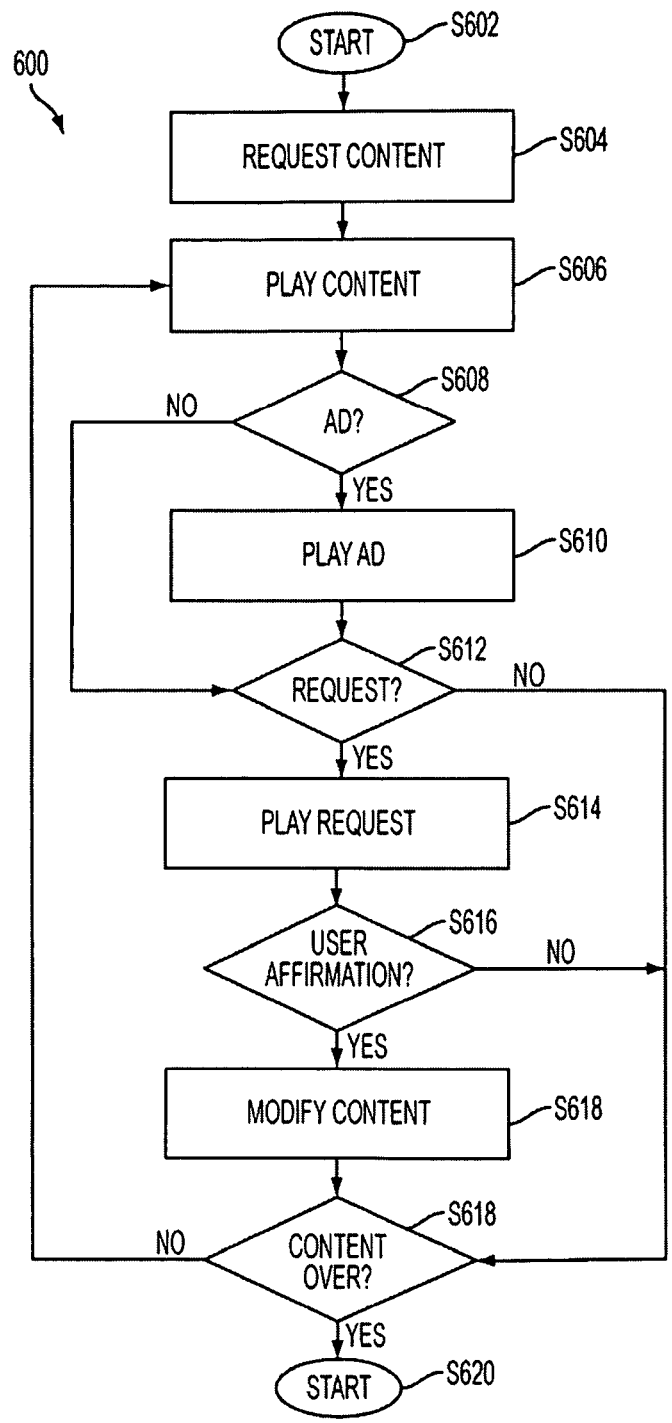
FIG. 6 is a flow diagram of an example method of operation of the system depicted in FIG. 5 to play back video data in accordance with an aspect of the present invention.

FIG. 6 is a flow diagram of an example method of operation of system 500 to play video data in accordance with an aspect of the present invention.

In operation, the method of operation starts (S602) and a user requests content to be viewed (S604), such as by selecting a VOD program via set-top 514. The command is translated, by set-top 514, and sent via access network 510 to video processor 508, which receives the command and informs the VOD server 504 of the request.

VOD server 504 retrieves the appropriate content from database 506. In some embodiments, VOD server 504 may receive the content with conventional commercial advertisements pre-inserted. In other embodiments, VOD server 504 may assemble a playlist of program content and advertisement elements, such as request portions as discussed in more detail below, based on the system design.

Playout controller 518 establishes a playout schedule for the requested content (and conventional commercial advertisements if included) and additional advertisement elements from advertisement engine 520, based on content rules 522. The playout schedule is provided to stream controller 502.

Stream controller 502 assembles the requested content (and conventional commercial advertisements if included) and additional advertisement elements as a content package. VOD server 504 sends the content package to video processor 508 to be transmitted via access network 510.

The content package is then sent to video processor 508 to be transmitted downstream to set-top 514 via access network 510. Set-top 514 plays the content on TV 216 (step S606).

An example content package will now be described with reference to FIG. 7A.

Figure 7A:
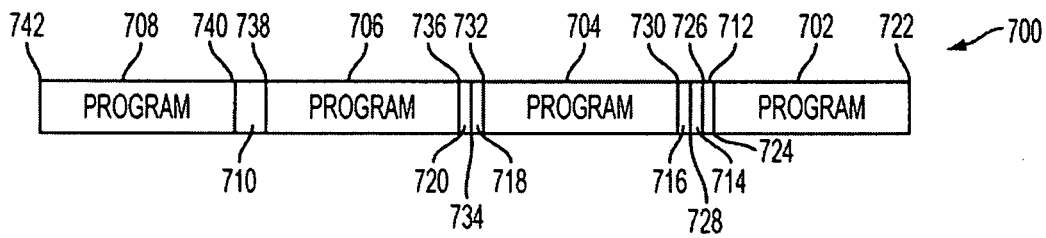
FIG. 7A illustrates an example initial content package in accordance with an aspect of the present invention.

FIG. 7A illustrates an example initial content package 700 in accordance with an aspect of the present invention. Initial content package 700 corresponds to the requested content that VOD server 504 might send through video processor 508. Initial content package 700 includes: program portions 702, 704, 706 and 708; an advertisement portion 710; and request portions 712, 714, 716, 718 and 720.

Set-top unit 514 would start playing content package 700 on television 516 at time 722. Set-top unit 514 would stop program portion 702 at time 724 to play request portion 712, and play request portions 714 and 716 consecutively at times 726 and 728, respectively. Set-top unit 514 would then start program portion 704 at time 730. Set-top unit 514 would stop program portion 704 at time 732 to play request portion 718, and play request portion 720 at time 734. Set-top unit 514 would then play program portion 706 at time 736. Set-top unit 514 would stop program portion 706 at time 738 to play advertisement portion 710 at time 738. Set-top unit 514 would then stop advertisement portion 710 at time 740 to start program portion 708. Set-top unit 514 would finally end program portion 708 at time 742.

Returning to FIG. 6, while set-top unit 514 is playing the requested content, it is determined whether a conventional commercial advertisement is to be played (S608). If so, for example at time 738 to play advertisement portion 710, then the advertisement is played (S610).

Further, it is determined whether an advertisement element, such as a request portions, is to be played (S612). If so, for example at time 726 to play request portion 714, then the request portion is played (S614).

When a request portion is played, as discussed above, it may include an overlay message with instructions to the user such as, "To learn more, press X", where X is a defined sequence of keystrokes on input device 512, like pressing the pause button twice. If the user decides to act upon the instructions, and the actions are taken (S616), such as appropriate keys being pressed, these actions are sent back up to stream controller 502. Stream controller 502 recognizes whether the appropriate key sequence is received within a predetermined response time.

Stream controller 502 may then pass a message to playout controller 518 while instructing set-top unit 514 to pause the content. In other embodiments, for example those for broadcast content, if set-top unit 514 is a recording device, playout controller 518 may instruct set-top unit 514 to continue recording the broadcast content while pausing the playback of the recorded broadcast content.

Playout controller 518 may then identify proper additional advertising content based on information from advertisement engine 520 and content rules 522 and instruct stream controller 502 to provide such additional advertising content to set-top unit 514.

Content package 700 would then be modified (S618) in response to the user affirmation. Two example types of content package modification will now be described with reference to FIGS. 7B and 7C.

Figure 7B:
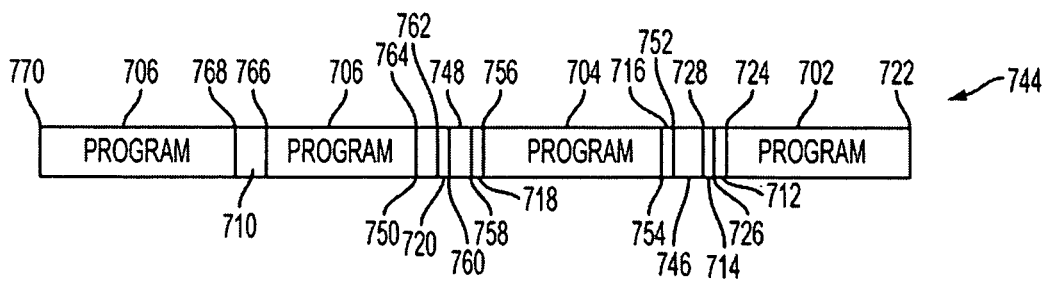
FIG. 7B illustrates an example content package in accordance with an aspect of the present invention, wherein additional advertising content is added, as a linear insertion, to an original content package.

FIG. 7B illustrates an example content package 744 in accordance with an aspect of the present invention, wherein additional advertising content is added, as a linear insertion, to an original content package. Content package 744 corresponds to content package 700 of FIG. 7A, wherein a user has affirmatively responded to request portion 714, request portion 718 and request portion 720. Content package 744 includes: program portions 702, 704, 706 and 708; an advertisement portion 710; request portions 712, 714, 716, 718 and 720; and requested advertisement portions 746, 748 and 750.

Set-top unit 514 would start playing content package 744 on television 516 at time 722. Set-top unit 514 would stop program portion 702 at time 724 to play request portion 712. Presume, in this example, the user does not provide the correct input in response to the request provided in request portion 712. As such, set-top unit 514 would stop request portion 712 at time 726 to play request portion 714. Presume, in this example, the user then provides the correct input in response to the request provided in request portion 714. As such, requested advertisement portion 746 is linearly inserted after request portion 714. Set-top unit 514 would stop request portion 714 at time 728 to play requested advertisement portion 746. Set-top unit 514 would stop requested advertisement portion 746 at time 752 to play request portion 716.

Set-top unit 514 would stop program portion 704 at time 756 to play request portion 718. Presume, in this example, the user provides the correct input in response to the request provided in request portion 718. As such, requested advertisement portion 748 is inserted after request portion 718. Set-top unit 514 would stop request portion 718 at time 758 to play requested advertisement portion 748. Set-top unit 514 would then stop requested advertisement portion 748 at time 760 to play request portion 720. Presume, in this example, the user then provides the correct input in response to the request provided in request portion 720. As such, requested advertisement portion 750 is inserted after request portion 720. Set-top unit 514 would stop request portion 720 at time 762 to play requested advertisement portion 750. Set-top unit 514 would stop requested advertisement portion 750 at time 764 to play program portion 706.

Set-top unit 514 would stop program portion 706 at time 766 to play advertisement portion 710. Set-top unit 514 would then stop advertisement portion 710 at time 768 to play program portion 708. Set-top unit 514 would stop program portion 708 at time 770.

Figure 7C:
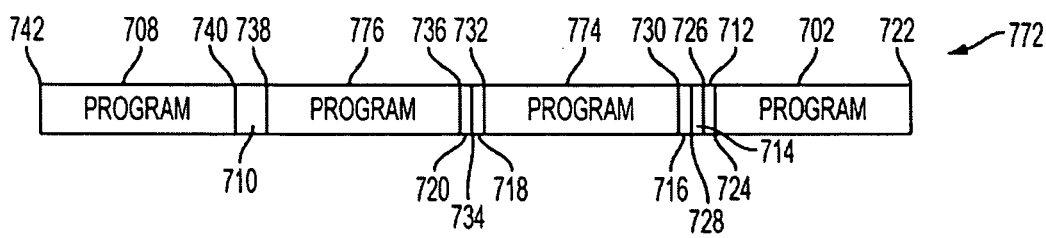
FIG. 7C illustrates an example content package in accordance with an aspect of the present invention, wherein a user has affirmatively responded to multiple request portions.

FIG. 7C illustrates an example content package 772 in accordance with an aspect of the present invention. Content package 772 corresponds to content package 700 of FIG. 7A, wherein a user has affirmatively responded to request portion 714, request portion 718 and request portion 720. Content package 772 includes: program portions 702, 774, 776 and 708; an advertisement portion 710; and request portions 712, 714, 716, 718 and 720.

Set-top unit 514 would start playing content package 772 on television 516 at time 722. Set-top unit 514 would stop program portion 702 at time 724 to play request portion 712. Presume, in this example, the user does not provide the correct input in response to the request provided in request portion 712. As such, set-top unit 514 would stop request portion 712 at time 726 to play request portion 714. Presume, in this example, the user then provides the correct input in response to the request provided in request portion 714. Set-top unit 514 would stop request portion 714 at time 728 to play requested portion 716. Presume, in this example, the user does not provide the correct input in response to the request provided in request portion 716. Set-top unit 514 would stop request portion 716 at time 730 to play program portion 774.

Figure 3:
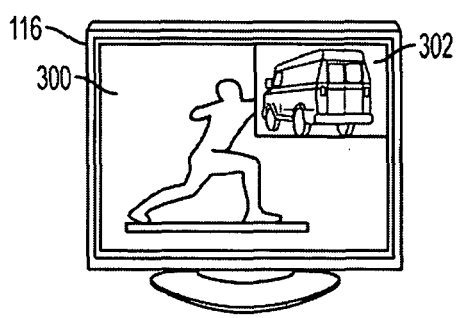
FIG. 3 illustrates an exemplary overlay.
Figure 4:
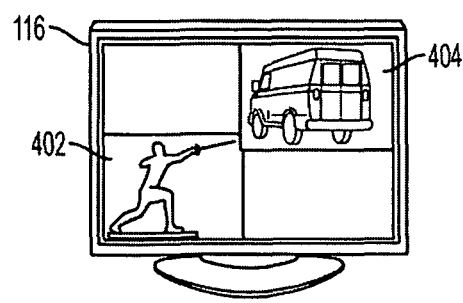
FIG. 4 illustrates an exemplary squeezeback.

In this example, the user provided the correct input in response to request portion 714. In contrast with the example of FIG. 7B, wherein the additional advertising content is linearly inserted into the original content, in this embodiment, a requested advertisement is then overlayed onto a portion of the program, for example as illustrated in FIGS. 3 and 4. Therefore, program portion 704 of FIG. 7A is replaced with a new program portion 774, having the requested advertisement corresponding to request portion 714, overlayed therein.

Set-top unit 514 would then stop program portion 774 at time 732 to play request portion 718. Presume, in this example, the user provides the correct input in response to the request provided in request portion 718. Set-top unit 514 would stop request portion 718 at time 734 to play request portion 720. Presume, in this example, the user then provides the correct input in response to the request provided in request portion 720. As such, requested advertisement portion 750 is inserted after request portion 720. Set-top unit 514 would stop request portion 720 at time 736 to play program portion 776.

In this example, the user provided the correct input in response to request portion 718 and request portion 720. Requested advertisements are then overlayed onto portion of the program, for example as illustrated in FIGS. 3 and 4. Therefore, program portion 706 of FIG. 7A is replaced with a new program portion 776, having the requested advertisements corresponding to request portion 714 and request portion 718, overlayed therein. In some embodiments, requested advertisements corresponding to request portion 714 and request portion 718 may be overlayed concurrently onto different portions of the display. In other embodiments, requested advertisements corresponding to request portion 714 and request portion 718 may be overlayed at different times during program portion 776 in the same portion of the display. In other embodiments, requested advertisements corresponding to request portion 714 and request portion 718 may be overlayed at different times during program portion 776 in different portions of the display.

Set-top unit 514 would stop program portion 776 at time 738 to play advertisement portion 710. Set-top unit 514 would then stop advertisement portion 710 at time 740 to play program portion 708. Set-top unit 514 would stop program portion 708 at time 742.

Returning back to FIG. 6, it should be noted that steps S608 and S610 may be switched with steps S612 and S614, respectively. In some embodiments, it may be determined whether an advertisement is to be played before it is determined whether and advertisement element, such as a request, is to be played. In some embodiments, it may be determined whether an advertisement element, such as a request, is to be played before it is determined whether and advertisement is to be played.

If it is determined that no advertisement is to be played, that no advertisement element is to be played (S612) or there is no user affirmation to a request portion (S616), then the requested content continues to play (S618) until the requested content is over (S620).

Figure 2:
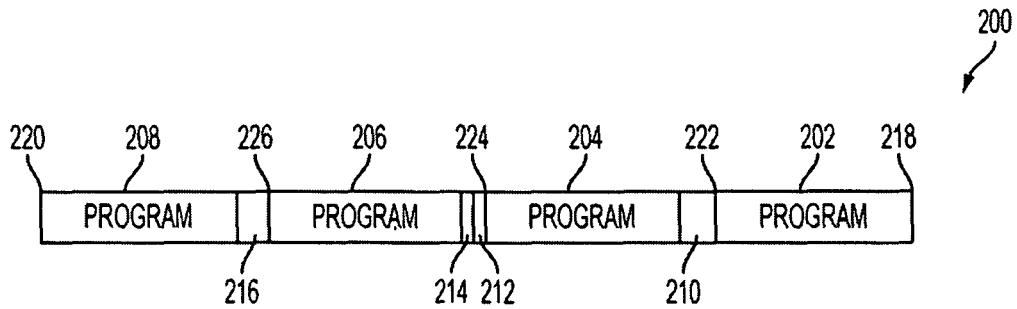
FIG. 2 illustrates an example content package.

By comparing an example conventional content package, for example as illustrated in FIG. 2, with an example content package in accordance with an aspect of the present invention, for example as illustrated in FIG. 7A, it is clear that a user may be required to endure less advertisement time without diminishing the ability to view a portion of each advertisement.

For example, conventional advertisement portion 210 is much larger than request portion 712. If a user were to view the beginning of the advertisement corresponding to advertisement portion 210 and then determine that they do not wish to view any more of the advertisement corresponding to advertisement portion 210, such a determination would be irrelevant. Specifically, the user would be subjected to the remaining portion of the advertisement corresponding to advertisement portion 210 before resumption of the program corresponding to program portion 204.

Alternatively, if a user were to view request portion 712 and then determine that they do not wish to view any more of the advertisement corresponding to request portion 210, such a determination would be very relevant. Specifically, in accordance with an aspect of the present invention, the user may not respond to the request and would not be subjected to additional advertisement.

The above discussed embodiments with reference to FIGS. 5-7C are drawn to a VOD aspect of the present invention. Other embodiments in accordance with the present invention are drawn to a Switched Digital Video (SDV) aspect. In other words, a source of data, e.g., video data, may be a server in the case of a VOD aspect of the present invention or may be a broadcast source in the case of a SDV aspect of the present invention. In the case of SDV, the video would come from a broadcast source of some type, non-limiting examples of which include a local broadcast station and a satellite provided broadcast. A video processor from a broadcast source could overlay an interactivity prompt, e.g., "For more info press 11 on your remote control." During a defined period of time, an SDV client in the set-top unit would intercept the remote control keystrokes and interpret "11" as a request for more information rather than a channel change request. The request for more information could trigger a variety of events—mail a catalog, view a long form commercial from VOD, etc.

It is clear that in accordance with an aspect of the present invention, a user may interactively control the amount of an advertisement he wishes to view. Further, a content provider may provide more advertisement requests in a program than conventional advertisements without increasing the total viewing time of a content package.

The interactive aspect of the present invention need not be limited to advertisements. Alternatively, the same interactive mechanism as described by the present invention may also be used to trigger other actions including, but not limited to, registering a vote, requesting information via email and creating a bookmark for either VOD or online systems that the user might access later.

In accordance with an aspect of the present invention, a mechanism to capture interactive responses related to broadcast content as previously exemplified, may be implemented on streaming content. In this exemplary mechanism, video processor 508 of FIG. 5, via overlay or squeezeback, might instruct the user to enter a specified channel number into their remote control. For example, a prompt might read "To vote for Contestant X, enter 123 on your remote control now." As exemplified in the previous embodiment of FIG. 5, video processor 508 would receive the channel change request and identify it as an interactive response based on the unique channel number. The response can then be used, but not limited to, actions such as capturing votes, requesting information, creating a bookmark or other interactive functions.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for use with a data provider operable to provide video content to a user, to receive a content demand for requested content from the user, to retrieve a portion of video content data corresponding to the content demand, to arrange the portion of video content data to include an advertisement, and to provide the arranged portion of the video content data, said system comprising:
   a controller operable to instruct the data provider to:
      add a request portion of data into the video content data, wherein the request portion of data corresponds to a graphic overlay having instructions to prompt the user to perform a defined sequence of keystrokes on an input device following the presentation of the advertisement in order to be presented with additional video advertising content related to the advertisement;
      determine whether the user performed the defined sequence of keystrokes on the input device corresponding to the instructions in the graphic overlay within a response time;
      provide the additional video advertising content and pause the providing of the arranged portion of the video content data in response to determining that the user performed the defined sequence of keystrokes on the input device corresponding to the instructions in the graphic overlay within the response time; and
      continue the providing of the arranged portion of the video content data after the additional video advertising content has been provided.

2. The system of claim 1, wherein said controller is further operable to instruct the data provider to provide the additional video advertising content as a linear insertion into the arranged portion of video content data.

3. The system of claim 1, wherein said controller is further operable to instruct the data provider to provide the additional video advertising content by replacing a portion of the arranged portion of video content data.

4. The system of claim 3, wherein said controller is further operable to instruct the data provider to provide the additional advertising content by modifying a portion of the arranged portion of video content data such that the additional video advertising content overlays a portion of the arranged portion of video content data when displayed on a display unit.

5. The system of claim 3, wherein said controller is further operable to instruct the data provider to provide the additional video advertising content by modifying a portion of the arranged portion of video content data such that the portion of the arranged portion of video content data, when displayed on a display unit, is scaled down and displayed adjacent with the additional video advertising content.

6. A display system for use with a data provider operable to provide content to a user, to retrieve a portion of video content data corresponding to a content demand, to arrange the portion of the video content data to include an advertisement, to provide the arranged portion of the video content data and to add a request portion of data into the video content data, the request portion of data corresponding to a graphic overlay having instructions to prompt the user to perform a defined sequence of keystrokes on an input device during the presentation of the advertisement in order to be presented with additional video advertising content, said display system comprising:

a unit operable to:
receive a content demand for requested content from the user;
provide a signal, based on the content demand, to the data provider;
receive the video content data from the data provider;
cause a display in communication with said unit to display content video based on the video content data and the advertisement;
receive the request portion of data from the data provider;
cause the display unit to display the graphic overlay with the instructions to prompt the user to perform the defined sequence of keystrokes on the input device during the presentation of the advertisement in order to be presented with the additional video advertising content;
determine whether the user performed the defined sequence of keystrokes on the input device corresponding to the instructions in the graphic overlay within a response time;
provide a signal to the data provider requesting the additional video advertising content and causing the data provider to pause the providing of the arranged portion of the video content data in response to determining that the user performed the defined sequence of keystrokes on the input device corresponding to the instructions in the graphic overlay within the response time;
cause the display unit to display the additional video advertising content; and
provide a signal to the data provider to cause the data provider to continue the providing of the arranged portion of video content data after the additional video advertising content has been displayed.

7. The display system of claim 6, further comprising an input device operable to provide an input to said unit based on the the defined sequence of keystrokes being performed by the user.

8. The display system of claim 7, wherein said unit causes said display to display the additional video advertising content as a linear insertion into the arranged portion of video content data.

9. The display system of claim 7, wherein said unit causes said display to display the additional video advertising content by replacing a portion of the arranged portion of video content data.

10. The display system of claim 9, wherein said unit causes said display to display the additional video advertising content by modifying a portion of the arranged portion of video content data such that the additional video advertising content overlays a portion of the arranged portion of video content data when displayed.

11. The display system of claim 9, wherein said unit causes said display to display the additional video advertising content by modifying a portion of the arranged portion of video content data such that the portion of the arranged portion of the video content data, when displayed, is scaled down and displayed adjacent with the additional advertising.

12. A method of using a data provider operable to provide video content to a user, to receive a content demand for requested content from the user, to retrieve a portion of video content data corresponding to the content demand, to arrange the portion of video content data to include an advertisement and to provide the arranged portion of the video content data, said method comprising:

adding a request portion of data into the video content data, wherein the request portion of data corresponds to a graphic overlay having instructions to prompt the user to perform a defined sequence of keystrokes on an input device following the presentation of the advertisement in order to be presented with additional video advertising content related to the advertisement;
determine whether the user performed the defined sequence of keystrokes on the input device corresponding to the instructions in the graphic overlay within a response time;
providing the additional video advertising content and pausing the providing of the arranged portion of the video content data in response to determining that the user performed the defined sequence of keystrokes on the input device corresponding to the instructions in the graphic overlay within the response time; and
continuing the providing of the arranged portion of the video content data after the additional video advertising content has been provided.

13. The method of claim 12, wherein the additional video advertising content is provided as a linear insertion into the arranged portion of video content data.

14. The method of claim 12, wherein the additional video advertising content replaces a portion of the arranged portion of video content data.

15. The method of claim 14, wherein the additional video advertising content is provided by modifying a portion of the video content data such that the additional video advertising content overlays a portion of the arranged portion of video content data when displayed on a display unit.

16. The method of claim 14, wherein the additional video advertising content is provided by modifying a portion of the arranged portion of video content data such that the portion of the arranged portion of video content data, when displayed on a display unit, is scaled down and displayed adjacent with the additional video advertising content.

* * * * *